United States Patent
Nink

[15] 3,658,348
[45] Apr. 25, 1972

[54] SEAL FOR PISTON RODS AND PISTONS OF PISTON MACHINES

[72] Inventor: Heinz Nink, Gladbeck, Germany
[73] Assignee: Borsig Gesellschaft mit beschrankter Haftung, Berliner Strasse, Berlin, Germany
[22] Filed: May 22, 1970
[21] Appl. No.: 39,826

[30] Foreign Application Priority Data
May 22, 1969   Germany..................P 19 26 102.0

[52] U.S. Cl. .................................277/58, 92/165 R
[51] Int. Cl...........................................F16j 15/24
[58] Field of Search................277/105, 107, 102, 58, 59; 92/165 R, 165 PR, 168

[56] References Cited
UNITED STATES PATENTS

| | | | |
|---|---|---|---|
| 843,230 | 2/1907 | McCarthy | 277/106 |
| 1,035,484 | 8/1912 | Shahan | 277/105 |
| 3,490,774 | 1/1970 | Henry et al. | 277/58 |

Primary Examiner—Robert I. Smith
Attorney—Walter Becker

[57] ABSTRACT

A composite seal for sealing a high pressure side of a reciprocable member relative to the low pressure side thereof, in which two groups of sealing units are provided and arranged respectively at the high pressure side and the low pressure side, said sealing units which are in substantially axial alignment each having supporting ring means and sealing ring means.

5 Claims, 5 Drawing Figures

PATENTED APR 25 1972

Inventor:
Heinz Nink
By

SEAL FOR PISTON RODS AND PISTONS OF PISTON MACHINES

The present invention relates to a seal composed of a sealing units of different structure for piston rods and pistons of piston machines for high pressures.

With sealing arrangements of this type, for instance for piston rods, it is necessary to seal the cylinder with regard to its environment either against atmospheric pressure or against the pressure of a stopping medium. The pressure in the cylinder varies considerably; with compressors, the cylinder-pressure ratio, i.e., feeding pressure : suction pressure, amounts to from (3 to 5) : 1, and with so-called rotary or circular compressors the ratio is lower. With compressors the gas temperatures are as high as approximately 200° C., and with rotary compressore the gas temperatures are as high as about 60° C. At present pressures up to 2,500 atmospheres above atmospheric pressure are employed with lubricated compressors. Seals for lubricated machines should with a minimum of leakage get by with a minimum of sealing units which with a short running-in period and with a minimum of pressing pressure and with a minimum quantity of lubricant will form a sufficient supporting lubricating film. For a dryrun, which at present is carried out at pressures up to about 200 atmospheres above atmospheric pressure with a safe operation, materials are employed which on the piston rod form sliding layers made up of minor quantities of worn off material, said layers having as small a coefficient of friction as possible with regard to the sealing units. Inasmuch as a piston rod in operation will at the area of the stationary seal and when the piston rod is moving along a horizontal plane carry out small transverse movements, which are due to the slight bending caused by its weight, to the play in the guiding means for the piston rod and to unavoidable small eccentricities of the axial forces, it is necessary that the sealing units have a small mass and are easily displaceable in order to keep at a minimum additional forces due to the inertia forces and the displacement forces. With all sealing arrangements, a plurality of sealing units are arranged one behind the other. Inasmuch as an absolute tightness cannot be realized, such an arrangement amounts to a series arrangement of flow resistances. The tightness of a sealing arrangement thus increases with the number of sealing units and with the specific tightness of the individual sealing units. Theoretical contemplations when applying the teaching of the theory of flowing fluids and measurements have proved that the major portion of the pressure drop to be absorbed by the sealing units have to be absorbed at the low pressure side. The sealing units at the high pressure side, on the other hand, practically absorb only the pressure variations in the cylinder. The intermediate part of the sealing units contributes little to a sealing.

The problem in connection with the design of a sealing element thus concentrates on so to design the individual sealing units that the areas of great load at both ends of the seal are not subjected to high stresses and that the sealing units can after a short running-in time be placed under full load.

It is known to employ as sealing units for a piston rod sealing relatively few well sealing three-ring-systems of metallic materials. In this connection, by means of wedge elements having different wedge angles it is to be brought about that the pressing pressure derived from deviating the axial force due to the pressure differences at the sealing unit does not become too great (German Pat. No. 502,578). Tests have proved that the suggested wedge angle staging is qualitatively incorrect. Such sealing units have furthermore the drawback that their mass is considerable and that at many areas a considerable skill is required when manufacturing such sealing units if it is desired that all areas of contact fit properly and have a satisfactory carrying ability.

Furthermore arrangements have become known according to which relatively many individual less satisfactory sealing units are employed. These sealing units are cut tangentially and radially or radially. The mechanical connection during the assembly and operation is in this instance effected, for instance, by hose springs. Such systems have the drawback that they have relatively great dimensions, are composed of many individual elements and the manufacture thereof requires a very great skill for the production of certain areas if it is desired that many contact areas have a good carrying ability.

All heretofore known seals for the purpose involved are principally built up from uniform sealing units. They do not take into consideration the above outlined special loads, to which the two function sections - high pressure side and low pressure side, — are subjected. Efforts made in this direction relate, for instance, to the above mentioned wedge angle staging of the above referred to sealing units and to the employment of so-called throttle rings as first sealing elements of the pressure side. With the heretofore known constructions of throttle rings, rings without a radial separating area are involved which with radial play are mounted on the piston rod. Tests have proved that such rings are from a practical standpoint without effect since the ring slots with regard to the volume between the throttle ring and the first sealing unit are rather large. Other throttle ring constructions employ radially or tangentially divided elements as they are employed in the above mentioned sealing units. The drawbacks have already been mentioned. All heretofore known sealing constructions do not permit the employment of relatively soft materials for sealing purposes without a preceding running-in period because between the supporting discs used with many designs and the piston rod or the piston there is provided a measurable annular gap into which soft sealing materials can be squeezed or deformed as a result of high pressure differences. All tests to accomplish an effective, operationally safe and economic separation of the functions of the above described type appear to have failed so far.

It is, therefore, an object of the present invention to provide a seal made up of sealing units in such a way that the structural design of the sealing units will permit an adaptation of the seal to the special requirements or features of the two function sections.

It is another object of this invention to provide a seal as set forth in the preceding paragraph, which will permit the employment of as many uniform elements as possible for the two types of sealing units.

It is a further object of this invention to provide a seal as set forth in the two preceding paragraphs, which will permit the employment of soft materials without running-in period as most active sealing elements.

It is still another object of this invention to provide a seal as set forth above which will permit the manufacture of the elements of the seal at a minimum of costs.

It is a still further object of this invention to provide a seal as set forth above which can equally well be employed as dry-run seal.

Still another object of this invention consists in the provision of a sealing ring composed of solid material which can easily be produced as to acurate size and which will always seal in a tight manner from the first installation to the ultimate permissible wear.

These and other objects and advantages of the invention will appear more clearly from the following specification in connection with the accompanying drawings, in which.

Figure 1:
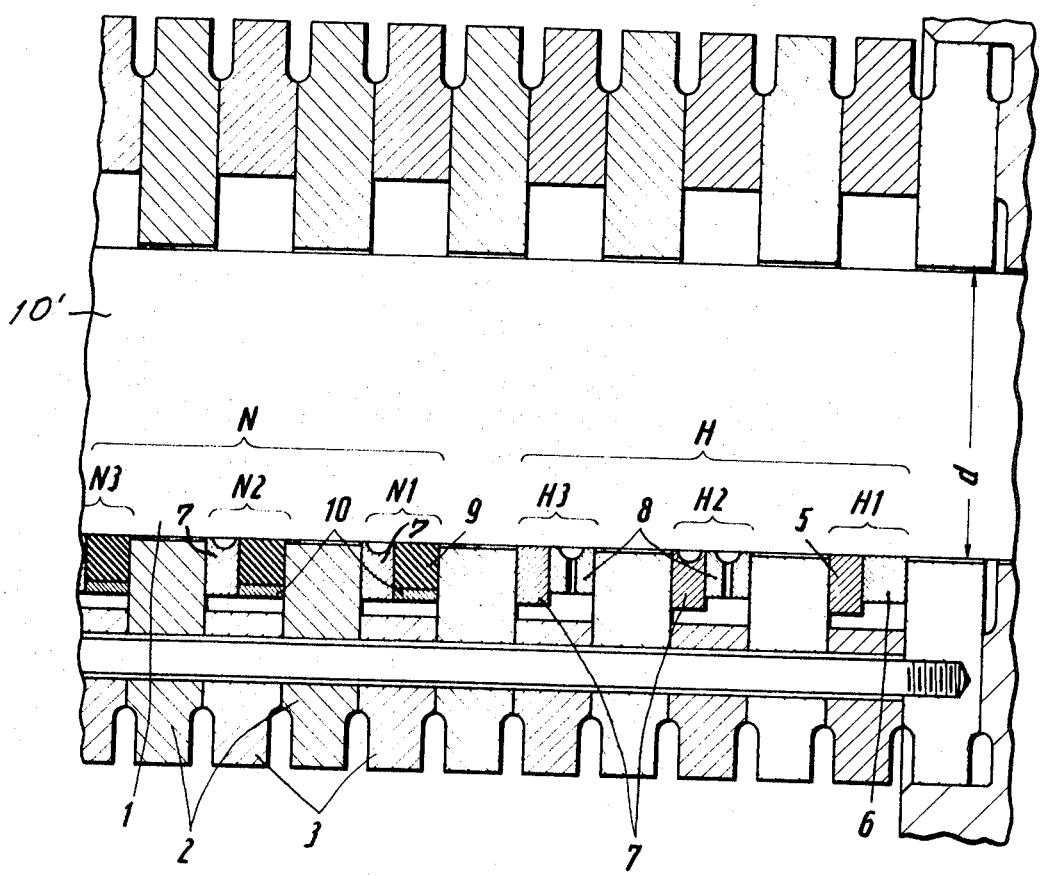
FIG. 1 represents a longitudinal section through a piston rod seal according to the present invention.

A seal composed of a plurality of sealing units of different structure for piston rods and pistons of piston machines for high pressures according to the present invention is characterized primarily in that the seal comprises a high pressure side and a low pressure side while each sealing unit includes a supporting ring and a sealing ring.

In order to prevent soft sealing material from being deformed and pressed into the annular gap between the supporting ring and the part to be sealed, it is suggested according to a further development of the invention, to assemble the supporting ring consisting of solid material without play with regard to the reciprocatory piston rod or piston. The play-free assembly of the supporting ring in radial direction is, with materials having no essential plastic deformation prior to reaching the breaking stress point (for instance grey iron or sinter material), effected by breaking the supporting ring prior to the installation in the seal at an area of the circumference, the inner diameter of the supporting ring being only slightly smaller than the diameter of the piston rod or piston.

If the supporting ring is composed of a material having a substantial plastic deformation prior to reaching the breaking stress point, the supporting ring is prior to its installation into the seal provided at an area of the circumference with a radial bore and is broken at this area, the inner diameter of the supporting ring being considerably smaller than the diameter of the piston rod or piston.

In order to prevent an unstable behavior of the supporting ring when the latter is subjected to a considerable circumferential load in view of high pressure differences, it is suggested, according to a further development of the invention, to provide the supporting ring with such radial wall thickness which will be stable with regard to all occurring stresses.

In view of the play-free engagement of the supporting rings, the sealing rings at the high pressure side can be inserted with considerable closing play so that, in conformity with the invention, the sealing rings of the high pressure side will consist of piston rings clamping in inward direction.

Inasmuch as the supporting rings operate practically without play and during the starting phase work with negligible low closing play, and since the low pressure side has to absorb the higher pressure differences at its sealing units, the sealing rings of the low pressure side consist, in conformity with the present invention, of soft packing material not requiring a running-in period.

In order to assure a positive engagement of the sealing material at the low pressure side, which sealing material has no or not sufficient rigidity of its own, the sealing ring is at its cylindrical mantle surface surrounded by an inwardly clamping cover ring.

For purposes of reducing the surface pressure between the supporting and sealing rings on one hand and the piston rod or piston on the other hand, depending on the respective requirements, the supporting rings and/or sealing rings or a group of both is designed so as to be relieved.

If it is desired to relieve only the elements subjected to maximum load, the supporting rings and sealing rings or a group of both are relieved only at the sealing units which are subjected to the highest loads.

In order to provide a sealing ring which consists of solid material and can easily be produced with accuracy to gauge or size and which will maintain an at least approximately uniform sealing effect from the time of its installation to the ultimately permissible wear, the sealing ring has such butt or joint that its plane surface of intersection with the tangential surface to the cylindrical mantle surface of the piston rod or piston forms an angle of from 20° to 60° along the line of contact of said plane surface of intersection with the mantle surface.

When the piston rods and pistons are designed for dry running, the supporting rings and sealing rings are made of substances suitable for such dry running.

Figure 2:
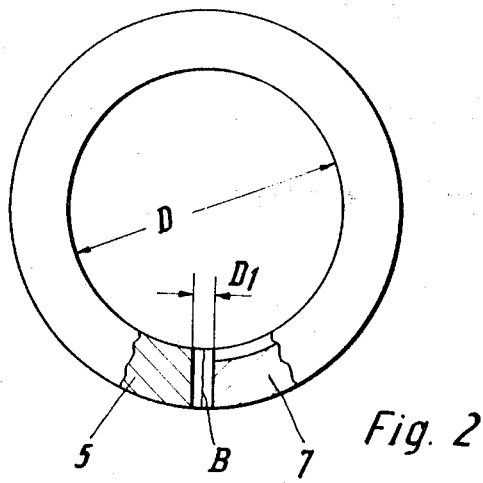
FIG. 2 illustrates partially in cross-section a supporting ring with a radial bore, on one side without and on the other side with relief.

Referring now to the drawings in detail, the piston rod 1 is supposed to be able to carry out a reciprocatory movement. In view of the play in the guiding means for the piston rod or due to the sagging of the piston rod in view of its weight when the piston rod or piston moves along a horizontal plane, or in view of unavoidable minor eccentricities of the axial forces, unavoidable small transverse movements occur. Separating discs 2 and spacer discs 3 are held together, for instance, by screws 4 for the purpose of installation and are fixed in their respective relative positions. The two function sections, namely the high pressure side H and the low pressure side N, are in the illustrated arrangement preferably formed by identical sealing units $H_1$–$H_3$ and $N_1$–$N_3$. The number of the sealing units depends on the pressure difference and on other conditions. The sealing unit $H_1$ comprises a supporting ring 5 and a sealing ring 6. The drawing furthermore shows a modified sealing unit $H_2$ which is composed of a relieved supporting ring 7 and a relieved sealing ring 8. Various designs are known for relieving sealing elements. All such designs show a connection of one part of the sealing surface with the outer surface of the sealing element. A design of a supporting ring 5 or 7 ready for assembly is illustrated in FIG. 2. The supporting ring is produced with an inner diameter D which is slightly shorter than the diameter $d$ of the piston rod according to FIG. 1, for instance, by 0.01 mm if the piston rod diameter amounts to 100 mm. Subsequently, the supporting ring is broken at the area B. If materials are employed with a substantial plastic deformation prior to reaching the breaking stress point, it is suggested in conformity with the present invention to provide a radial bore as shown in FIG. 2 with a transverse bore diameter $D_1$. During installation, at the breaking area, there will be obtained, for instance, a small closing play of 0.0314 mm in view of the undersize $d - D$, which play will disappear rapidly during the running-in period in view of the fact that the roughness of the surface is quickly worn off the support 5 and 7.

The sealing rings 6 and 8 are, in conformity with the present invention, designed as inwardly clamping piston rings with a rectangular cross-section and straight joint or butt surface. The closing play for the assembled condition is relatively great and amounts, for instance, to from 7 to 8 mm with a piston rod diameter of 100 mm. At the low pressure side N, the sealing units $N_1$ to $N_3$ are formed of identical supporting rings 5 or 7; 5 and 7 and of the sealing rings 9 which are formed of soft material which is cut to size and has a square or rectangular cross-section. Such material may be, for instance, braided material, which is not attacked by gases. As such material may be used e.g., PTFE impregnated white asbestos yarn or Johns-Manville CHEMPAC–2009. The sealing rings 9 may also be made of suitable soft solid material, for instance, of synthetic material in the form of piston rings with overlapping joints. As such synthetic material may be used teflon with carbon (graphite). The inwardly clamping cover rings 10 will assure a positive connection of the sealing rings 9.

The invention may also be employed for piston rods and pistons of dry running machines by making the supporting and sealing rings of materials which are suitable for dry running operation. Thus, the supporting rings may be made of sinter metal, e.g., lead, tin, bronze, graphite, and the sealing rings may be made of teflon with carbon.

The advantages obtained by the present invention consist primarily in that the supporting rings which are assembled under slight pressure will, in view of the rather small closing play at the breaking area B whereby the tips of the surface roughness are worn off in a minimum of time, run-in in a short time and without surface pressure being exerted upon the piston rod or piston supporting the sealing rings. Due to this fact, soft materials can be employed for the sealing rings which do not require a running-in period. The subdivision into two functional regions is advantageous for the high pressure side H the sealing units of which represent best fitted throttle rings and are well suited to absorb varying and constant pressure differences. Among the advantages there is to be mentioned that during the possible short return flow period following a pressure change in the cylinder, for instance, gases can easily flow back from the chambers between the sealing units in view of the fact that due to the closing play of the sealing rings the combination of supporting and sealing rings has only a poor sealing effect in the direction toward the high pressure side.

At the low pressure side N, no return flows occur because here the pressures are constant as to time and no alternating pressure differences occur. For this reason, the application of soft materials for the sealing rings of the low pressure side yields considerable advantages inasmuch as here the highest pressure differences occur. Only in view of the employment of soft materials will it be possible here to work without running-in period. This is possible only due to the employment of supporting rings according to the invention. A further advantage of the sealing units is seen in the fact that they can be designed of low weight and that at all units identical supporting rings can be employed. In this way, with unavoidable small transverse movements of the piston rod, only small additional forces will occur and the number of structural elements will be kept small. A further advantage for the thus designed seals consists in that with lubricated piston machines the required amount of lubricant for the seals will be considerably smaller than is the case with seals of heretofore known designs. This is due to the fact that within the region of the highly stressed low pressure side with regard to pressure differences the soft materials of the pressure rings will absorb the lubricant and thus will contribute to the formation of a lubricating film. This is not the case with most heretofore employed metallic substances. When employing suitable materials, it is possible with designs similar to those set forth above also to provide seals for dry running machines.

Figure 3:
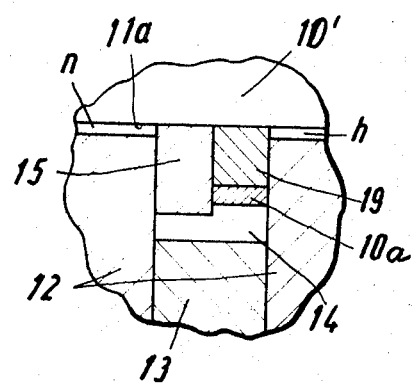
FIG. 3 is a longitudinal section through a modified sealing ring unit for a piston rod.
Figure 4:
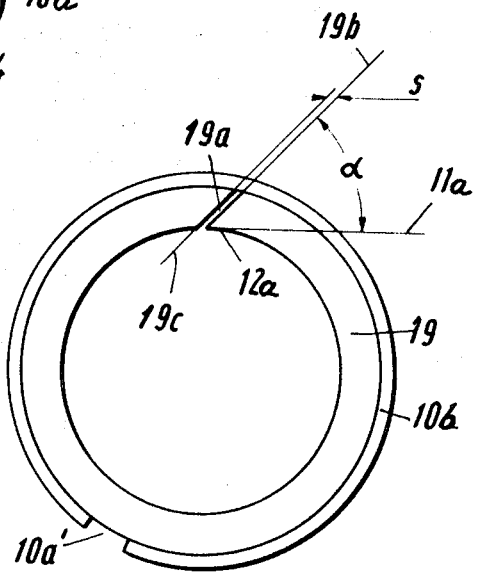
FIG. 4 shows a view of a sealing ring with an inwardly clamping cover ring in assembled condition.
Figure 5:
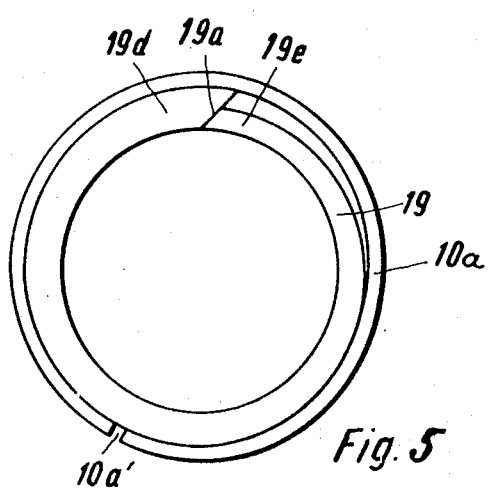
FIG. 5 is a view similar to that of FIG. 4 but in a condition after a long period of operation and a corresponding wear of the sealing ring.

Referring now to FIGS. 3–5, it is again assumed that the piston rod 10' carries out reciprocatory movements. The cylindrical mantle surface of the piston rod 10' is designated with the reference numeral 11a. It is furthermore assumed that in the space h a high pressure prevails which is to be sealed against the low pressure in the space n. To this end, two separating discs 12 and an intermediate disc 13 form a chamber having arranged therein a sealing unit 15, 19, 10a. Each sealing unit comprises a supporting ring 15, a sealing ring 19 with a joint 19a according to the invention and cut surfaces 19b and 19c as well as a cover ring 10b with the butt 10b'. The tangential surface with regard to the cylindrical mantle surface 11a at the line of contact of the plane surface 19b with the cylindrical mantle surface 11a is designated with the reference numeral 11b. The surface 19b forms with the tangential surface 11b the angle α which may amount to from 20° to 60°. When the angle α is zero, there is obtained the well known tangential joint. Such tangential joint is employed for multi-sectional sealing rings. It has the disadvantage that it always comprises a part 12a which is extremely weak from a mechanical standpoint and is easily and in a short time destroyed in excess of the normal wear. The high pressure of the space h is conveyed into the space u at the outer circumference of the sealing unit. As a result thereof, the sealing ring 19 is from the circumference thereof on subjected to a pressure difference due to the fact that the circumference of the piston rod 11a is constant with the exception of the values varying due to heat expansion. It will be appreciated that when the sealing ring 19 is subjected to wear, the two ends 19d and 19e of the sealing ring 19 will be pushed one above the other as shown in FIG. 5. If the angle α becomes zero, the so-called straight joint is obtained. This joint is not suitable for sealing rings because it does not permit, during the unavoidable wear of the sealing rings, that the inner circumference adapts itself to the circumference of the piston rod. The sealing ring will be particularly tight from the start if its joint play s is made so great that at a maximum temperature of operation in view of possible differing heat expansion of the piston rod 10' and sealing ring 19, the joint play s practically becomes zero.

In order that the sealing ring 19 of a material having no high mechanical strength will also in non-loaded condition be subjected to an inwardly directed pressing force, there is provided an inwardly clamping pressure ring 10b. Its joint 10b' is decreased with occurring wear of the sealing ring 19, for instance, from the size shown in FIG. 2 to the size shown in FIG. 3. When further wear of the sealing ring 19 occurs, the joint 10b' will become zero. The joint 10b' will be designed of such a magnitude that the piston rod 10' cannot be touched by the cover ring 10b when the joint 10b' is, in view of the wear of the sealing ring 19, reduced to the magnitude zero. The joint 10b' is during the assembly so arranged that it will engage that portion of the sealing ring 19 which is located opposite to the joint 19a. If the joint 10b' were arranged in the area of the joint 19a, it would be possible that the two ends of the inwardly clamping cover ring 10b would move one above the other during a further wear of the sealing ring 19 so that for the magnitude of the joint 10b' minus values, in other words values less than zero, would be obtained. In such circumstances, there exists the danger that one end of the cover ring 10b which clamps in inward direction will at a complete wear of the sealing ring 19, contact or engage the piston rod 10'.

As will be seen from the above, the advantages obtained with the design of FIGS. 3–5 consist primarily in that a one-piece sealing ring 19 can be made of a material which does not require a running-in period while the sealing ring has a joint 19a and when being subjected to wear, will without a decrease in the sealing ability of the other annular parts remain tight. This is due to the fact that in view of an uneven wear of the joint portion alone, the condition of wear of the entire sealing ring 19 will be compensated for. By properly dimensioning the joint play s, it is possible from the very start to obtain a good sealing ability also of the joint 19a. The piston rod 10' cannot be contacted by the inwardly clamping cover ring 10b if the joint 10b' of this cover ring is located on that side portion of the sealing ring 19 which is located opposite to the joint 19a.

It is, of course, to be understood that the present invention is, by no means, limited to the particular showing in the drawings but also comprises any modifications within the scope of the appended claims.

What I claim is:

1. A composite seal for a reciprocable member of reciprocable piston machines for sealing a high pressure side relative to a low pressure side, which includes: a first group of sealing units for use at the high pressure side, and a second group of sealing units for sealing at the low pressure side, said groups being in substantially axial alignment with each other, and each of the sealing units of each of said groups having a supporting ring and a split sealing ring for sealing engagement with the reciprocable member to be sealingly engaged, the supporting rings having their inner diameter so dimensioned as to engage the reciprocable member to be sealingly engaged without radial play, the sealing rings having a substantially cylindrical mantle surface, and a resilient covering ring biased inwardly and surrounding said sealing ring, said covering ring having a split arranged substantially diametrically opposite the split of said sealing ring.

2. A composite seal according to claim 1, in which the inner diameter of said supporting rings is undersized actually only slightly less than the outer diameter of the reciprocable member to be sealingly engaged thereby, a circumferential portion of said supporting rings having a break therein for sliding the same into position, said supporting rings accordingly serving double function of sealing and support.

3. A composite seal according to claim 1, in which said sealing rings of said first group are resilient and biased inwardly.

4. A composite seal according to claim 1, in which the sealing rings of said second group consist of soft packing material requiring no run-in period.

5. A composite seal for a reciprocable member of reciprocable piston machines for sealing a high pressure side relative to a low pressure side, which includes: a first group of sealing units for use at the high pressure side, and a second group of sealing units for sealing at the low pressure side, said groups being in substantially axial alignment with each other, and each of the sealing units of each of said groups having a supporting ring and a sealing ring for sealing engagement with the reciprocable member to be sealingly engaged, sealing rings having a split with plane surfaces which together with the tangential plane to the contour of the inner periphery of the respective sealing ring through the line of section of said plane surfaces with the inner contour of the pertaining sealing ring form an angle of from 20° to 60°, the distance between said plane surfaces of the respective split having a magnitude corresponding to the difference in the thermal longitudinal extension of the sealing ring during the manufacturing temperature thereof and the thermal longitudinal extension of the reciprocable member to be sealingly engaged at the maximum temperature of operation and the distance equaling substantially zero between said plane surfaces at the same maximum speed of operation of said reciprocable member.

* * * * *